United States Patent
Coghill, Jr.

(10) Patent No.: US 8,465,031 B2
(45) Date of Patent: Jun. 18, 2013

(54) MODULAR BEACH CART SYSTEM

(75) Inventor: Thomas E. Coghill, Jr., Virginia Beach, VA (US)

(73) Assignee: Ronald Ritter, Hallandale Beach, FL (US)

(*) Notice: Subject to any disclaimer, the term of this patent is extended or adjusted under 35 U.S.C. 154(b) by 658 days.

(21) Appl. No.: 12/583,833

(22) Filed: Aug. 26, 2009

(65) Prior Publication Data

US 2010/0059950 A1    Mar. 11, 2010

Related U.S. Application Data

(60) Provisional application No. 61/091,788, filed on Aug. 26, 2008, provisional application No. 61/099,308, filed on Sep. 23, 2008.

(51) Int. Cl.
*B62B 3/04* (2006.01)
*B62B 3/10* (2006.01)

(52) U.S. Cl.
USPC ............................ 280/79.3; 280/47.35

(58) Field of Classification Search
CPC ............................ B62B 2202/404; B62B 7/12
USPC ............... 280/35, 656, 47.34, 47.35, 47.39, 280/47.41, 79.11, 79.2, 79.3, 79.7; 211/70.5, 211/119.005
See application file for complete search history.

(56) References Cited

U.S. PATENT DOCUMENTS

| | | | | |
|---|---|---|---|---|
| 2,999,693 A * | 9/1961 | Thorson | ............................ | 410/42 |
| 3,026,981 A * | 3/1962 | Youtie | ......................... | 193/35 R |
| 3,046,034 A * | 7/1962 | Herrick | ............................ | 280/35 |
| 3,438,506 A * | 4/1969 | Groth | ................................. | 211/4 |
| 3,527,354 A * | 9/1970 | Sokolow | ...................... | 211/70.5 |
| 3,610,431 A * | 10/1971 | Rodden | .......................... | 211/207 |
| 3,664,526 A * | 5/1972 | Dilday | ........................... | 414/508 |
| 3,688,757 A * | 9/1972 | Dusek | ............................ | 126/9 R |
| 3,874,531 A * | 4/1975 | Mayo | ............................. | 414/680 |
| 3,925,836 A * | 12/1975 | Simmonds | ..................... | 114/364 |
| 4,007,862 A * | 2/1977 | Heftmann | ...................... | 224/329 |
| 4,231,709 A * | 11/1980 | Corsetti | ........................ | 414/458 |
| 4,232,806 A * | 11/1980 | Shald | ............................ | 224/406 |
| 4,243,242 A * | 1/1981 | Waits | .......................... | 280/414.1 |
| 4,271,997 A * | 6/1981 | Michael | ........................ | 224/546 |
| 4,296,878 A * | 10/1981 | Ward et al. | ..................... | 224/459 |
| 4,316,615 A * | 2/1982 | Willette | ...................... | 280/47.26 |
| 4,423,899 A * | 1/1984 | Langmead | ......................... | 296/3 |
| 4,469,341 A * | 9/1984 | Creim | .......................... | 280/47.26 |
| 4,544,172 A * | 10/1985 | Poulouin | .................. | 280/47.331 |
| 4,561,667 A * | 12/1985 | Allia | ........................ | 280/47.331 |
| 4,602,802 A * | 7/1986 | Morgan | .................... | 280/47.331 |
| 4,703,944 A * | 11/1987 | Higson | ........................... | 280/30 |
| 4,712,803 A * | 12/1987 | Garcia | ...................... | 280/47.331 |
| 4,854,456 A * | 8/1989 | Lee | .................................. | 211/14 |
| 4,932,830 A * | 6/1990 | Woodburn | .................... | 414/495 |

(Continued)

*Primary Examiner* — Hau Phan
*Assistant Examiner* — Jacob Meyer
(74) *Attorney, Agent, or Firm* — Laurie Barcia

(57) ABSTRACT

Exemplary embodiments of the rack device allow the carrying capacity of a cart system to be selectively expanded to increase the carrying capacity. The rack device increases the carrying capacity of existing carts with limited capacity by piggybacking a rack onto the existing cart to cradle in bracket members large bulky beach items such as surfboard and kayaks on the side of, on top of or outside of the existing cart. A cart system is also provided. The cart system selectively expands the capacity of the cart system with bracket members to cradle large bulky beach items.

6 Claims, 16 Drawing Sheets

U.S. PATENT DOCUMENTS

| | | | | |
|---|---|---|---|---|
| 4,960,214 A * | 10/1990 | Sayers | | 211/133.2 |
| 5,016,765 A * | 5/1991 | Leonardo | | 211/189 |
| 5,037,118 A * | 8/1991 | Straube | | 280/79.6 |
| D319,907 S * | 9/1991 | Fountain | | D34/26 |
| 5,096,216 A * | 3/1992 | McCalla | | 280/414.1 |
| 5,114,165 A * | 5/1992 | Vogel | | 280/47.331 |
| 5,372,262 A * | 12/1994 | Benson et al. | | 211/26 |
| 5,480,170 A * | 1/1996 | Kaiser, II | | 280/30 |
| 5,531,464 A * | 7/1996 | Maurer et al. | | 280/47.35 |
| 5,539,941 A * | 7/1996 | Fuller | | 5/85.1 |
| 5,636,852 A * | 6/1997 | Sistrunk et al. | | 280/30 |
| 5,647,489 A * | 7/1997 | Bellis, Jr. | | 211/70.6 |
| 5,711,429 A * | 1/1998 | Brown | | 211/41.14 |
| 5,713,584 A * | 2/1998 | Crane | | 280/47.35 |
| 5,823,551 A * | 10/1998 | Conroy | | 280/47.131 |
| 5,871,219 A * | 2/1999 | Elliott | | 280/79.3 |
| 5,876,047 A * | 3/1999 | Dennis | | 280/47.35 |
| 5,876,050 A * | 3/1999 | Berger | | 280/79.2 |
| 5,941,229 A * | 8/1999 | Schlosser et al. | | 126/41 R |
| 5,957,350 A * | 9/1999 | Giles | | 224/310 |
| 5,957,353 A * | 9/1999 | Clement | | 224/546 |
| 6,022,032 A * | 2/2000 | Savage | | 280/47.24 |
| 6,131,925 A * | 10/2000 | Weldon | | 280/30 |
| 6,139,029 A * | 10/2000 | Shaw | | 280/8 |
| 6,142,492 A * | 11/2000 | DeLucia | | 280/47.331 |
| 6,142,544 A * | 11/2000 | Benzoni et al. | | 294/19.2 |
| 6,173,842 B1 * | 1/2001 | Fitzgerald | | 211/4 |
| 6,390,309 B1 * | 5/2002 | Tucker | | 211/85.7 |
| D470,798 S * | 2/2003 | Martin | | D12/106 |
| 6,533,298 B2 * | 3/2003 | Sims | | 280/47.26 |
| 6,550,791 B2 * | 4/2003 | Ramsey | | 280/47.19 |
| 6,561,396 B2 * | 5/2003 | Ketterhagen | | 224/310 |
| D479,159 S * | 9/2003 | Martin | | D12/106 |
| 6,619,485 B1 * | 9/2003 | Jenkins | | 211/4 |
| 6,648,349 B1 * | 11/2003 | Waller et al. | | 280/47.35 |
| 6,736,416 B1 * | 5/2004 | Romeo | | 280/47.26 |
| 6,758,482 B2 * | 7/2004 | Stallbaumer | | 280/47.27 |
| 6,793,223 B2 * | 9/2004 | Ondrasik et al. | | 280/47.35 |
| 6,796,319 B1 * | 9/2004 | Patarra et al. | | 135/16 |
| 6,805,113 B2 * | 10/2004 | Stephen et al. | | 126/25 R |
| 6,811,180 B1 * | 11/2004 | Molliere | | 280/652 |
| 6,883,267 B1 * | 4/2005 | Pruitt | | 43/54.1 |
| D508,455 S * | 8/2005 | Oakley et al. | | D12/317 |
| 6,962,354 B1 * | 11/2005 | Miller | | 280/47.26 |
| 6,993,931 B1 * | 2/2006 | Hamilton | | 62/457.7 |
| 7,017,940 B2 * | 3/2006 | Hatfull | | 280/652 |
| 7,070,196 B1 * | 7/2006 | Larsen et al. | | 280/414.1 |
| 7,210,545 B1 * | 5/2007 | Waid | | 180/65.1 |
| 7,296,816 B2 * | 11/2007 | Wilnau | | 280/414.2 |
| 7,311,487 B1 * | 12/2007 | Crossley et al. | | 414/331.06 |
| 7,451,709 B2 * | 11/2008 | Swartfager et al. | | 108/14 |
| 7,628,406 B1 * | 12/2009 | Thomas et al. | | 280/47.19 |
| 7,677,592 B2 * | 3/2010 | Giesler | | 280/656 |
| 7,703,795 B2 * | 4/2010 | Williamson | | 280/656 |
| 7,762,363 B1 * | 7/2010 | Hirschfeld | | 180/65.1 |
| 7,823,906 B2 * | 11/2010 | Darling, III | | 280/651 |
| 7,857,327 B2 * | 12/2010 | Reed | | 280/30 |
| 7,866,490 B1 * | 1/2011 | Bellis, Jr. | | 211/70.6 |
| 7,896,175 B1 * | 3/2011 | Corr et al. | | 211/86.01 |
| 7,963,530 B1 * | 6/2011 | Garcia | | 280/30 |
| 7,967,325 B1 * | 6/2011 | Burton et al. | | 280/656 |
| 8,069,939 B1 * | 12/2011 | Metzler | | 180/19.3 |
| 8,132,277 B2 * | 3/2012 | Buchanan | | 5/627 |
| 8,141,888 B1 * | 3/2012 | Levasa et al. | | 280/79.7 |
| D661,451 S * | 6/2012 | Armstrong et al. | | D34/17 |
| 2001/0052686 A1 * | 12/2001 | Galik | | 280/292 |
| 2003/0038457 A1 * | 2/2003 | Eskridge | | 280/648 |
| 2005/0116445 A1 * | 6/2005 | Hatfull | | 280/651 |
| 2005/0184479 A1 * | 8/2005 | Moore | | 280/47.34 |
| 2005/0225046 A1 * | 10/2005 | Wilnau | | 280/47 |
| 2006/0131834 A1 * | 6/2006 | Larsen et al. | | 280/414.1 |
| 2007/0056106 A1 * | 3/2007 | Roberts | | 5/620 |
| 2009/0001756 A1 * | 1/2009 | Dempsey et al. | | 296/173 |
| 2009/0148267 A1 * | 6/2009 | Crossley et al. | | 414/800 |
| 2009/0260159 A1 * | 10/2009 | Buchanan | | 5/617 |
| 2010/0102524 A1 * | 4/2010 | Larsen et al. | | 280/35 |

* cited by examiner

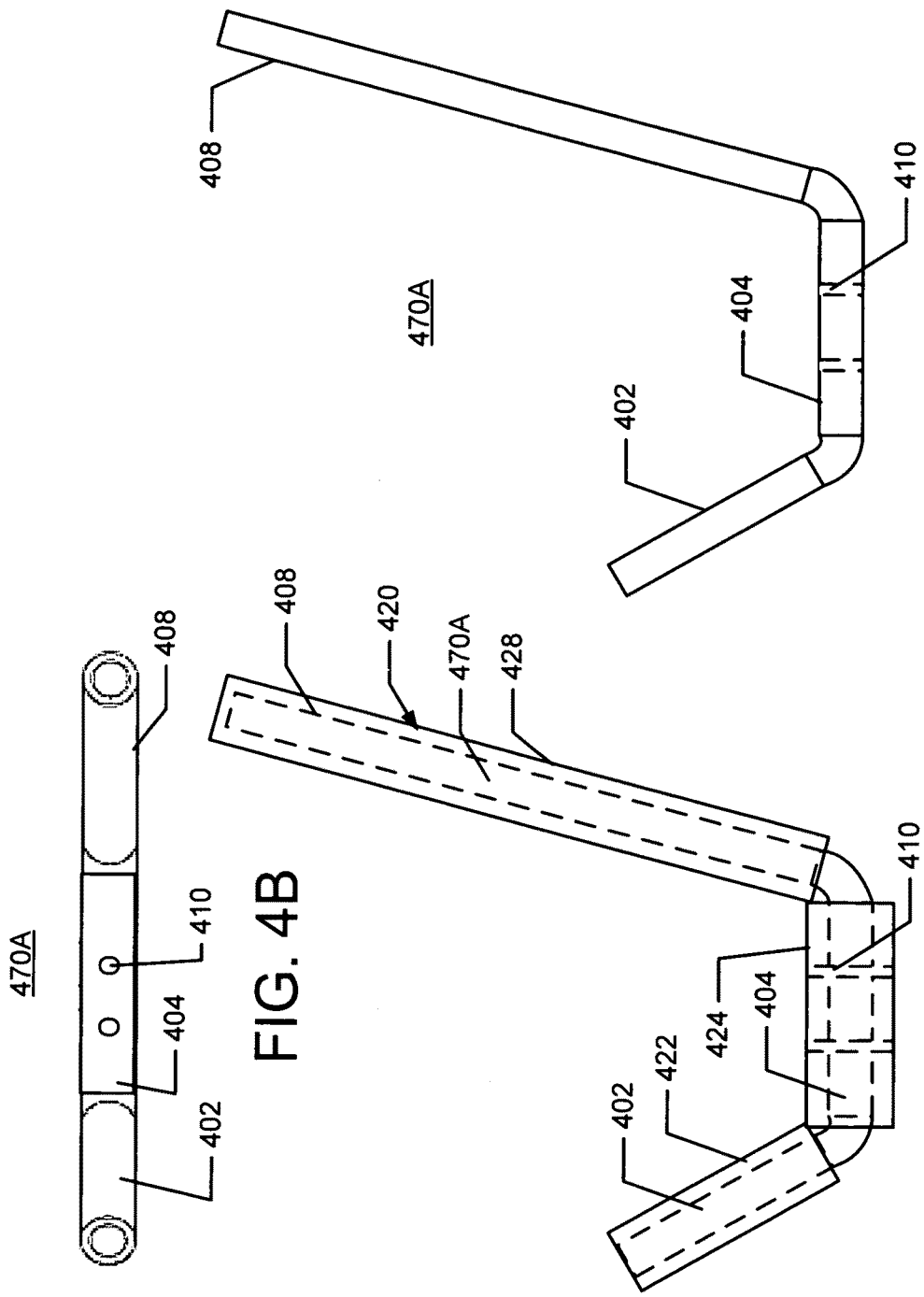

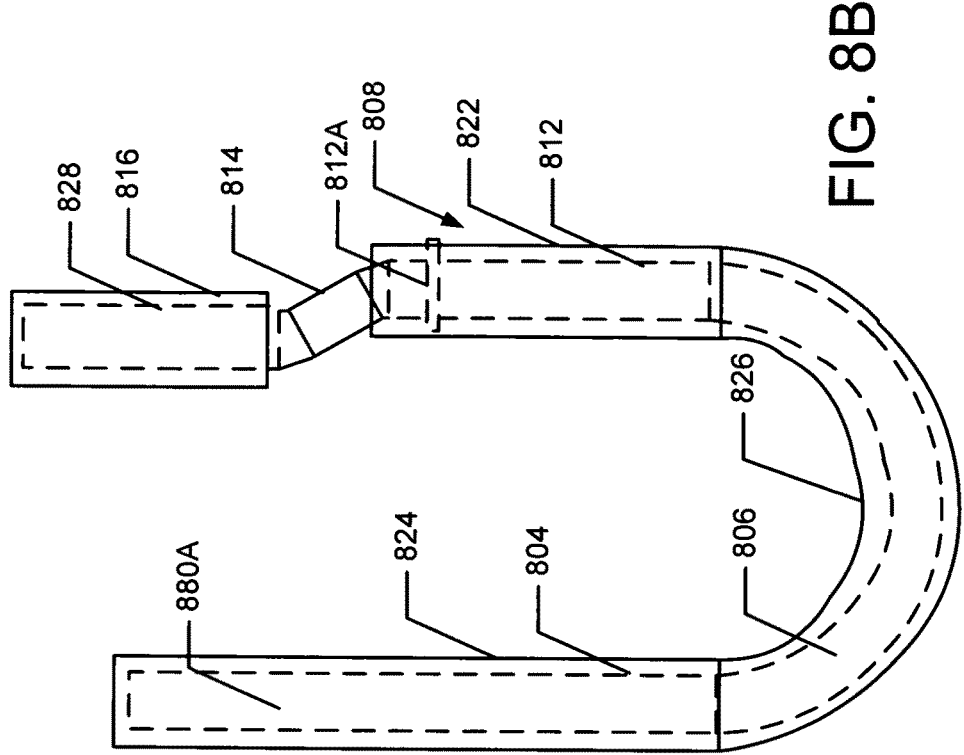
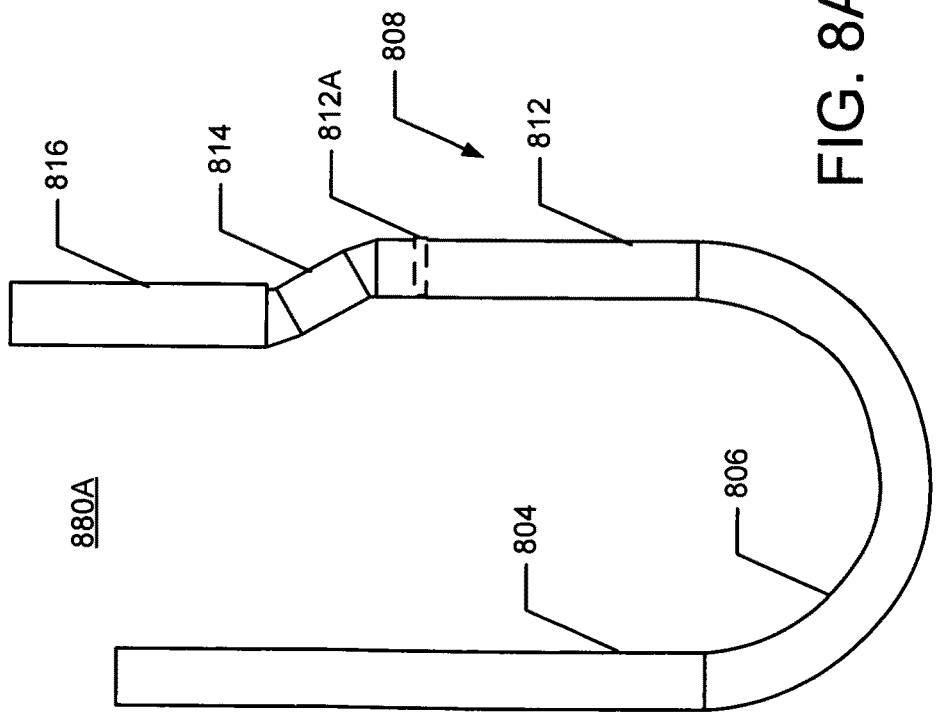

MODULAR BEACH CART SYSTEM

COPENDING APPLICATIONS

This application claims priority benefit of Provisional Patent Application No. 61/091,788 filed Aug. 26, 2008, titled "EZ Bike Attachment and Rack," having the inventor Thomas E. Coghill Jr. and Provisional Patent Application No. 61/099,308 filed Sep. 23, 2008, titled "EZ Bike Attachment and Rack," having the same inventors of the instant patent application.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

I. Field

The invention relates to hand-portable trailers which can be pulled by bicycles and all terrain vehicles (ATVs).

II. Background

Getting to the beach or other recreation areas with one or more of surfboards, coolers, skis, kayaks, canoes, etc. can be a chore requiring multiple trips back and forth to a vehicle or driving a motor vehicle onto restricted beach or recreational areas.

Although commercially available carts address some of these needs, none are large enough or otherwise have the carrying capacity to hold everything needed for a day at the beach, particularly if the user wants to bring a surfboard or other large items (e.g., kayak). Additionally available carts are not readily adapted to selectively carry several large items on a single cart chassis or rack.

Thus, there is a need for a rack or cart system with attachments to carry large amounts of gear (e.g., surfboards, a kayak) into areas where automobile access is difficult or not permitted. The rack or cart system is configured to be pulled by hand or attached to a small vehicle, such as a bicycle or ATV.

SUMMARY

The aforementioned problems, and other problems, are reduced, according to exemplary embodiments, by the systems and methods for.

According to an exemplary embodiment, a beach cart rack device for a wheeled cart is provided. The rack device comprises a rack frame comprising a plurality of horizontal frame members coupled together to form a plurality of corners and a plurality of vertical frame members coupled to the horizontal frame members in proximity to the plurality of corners. The rack device also includes connectors coupled to free ends of the plurality of vertical frame members, the connectors being configured to attach to a wheeled cart. The device further includes at least one bracket pair attached to the rack frame and being configured to cradle therein a surfboard or a kayak in a horizontal orientation, longitudinally, alongside or above the wheeled cart and in a tilted vertically upright orientation along a shortest axis.

According to another exemplary embodiment, a cart system is provided. The cart system comprises a cart frame comprising a top plurality of horizontal frame members coupled together to form a plurality of corners, a bottom plurality of horizontal frame members horizontally aligned in vertical space relation with respect to the top plurality horizontal frame members and a plurality of vertical frame members coupled to the top and bottom plurality of horizontal frame members in proximity to the plurality of corners. The cart system further includes a pair of wheel rotatably coupled to the cart frame and at least one bracket pair coupled to the cart frame and being configured to cradle therein a surfboard or a kayak in a horizontal orientation, longitudinally, alongside or above the wheeled cart and in a tilted vertically upright orientation along a shortest axis.

Other systems, methods, and/or products according to embodiments will be or become apparent to one with skill in the art upon review of the following drawings, and further description. It is intended that all such additional systems, methods, and/or products be included within this description, be within the scope of the present invention, and be protected by the accompanying claims.

BRIEF DESCRIPTION OF THE DRAWINGS

The above and other exemplary embodiments, objects, uses, advantages, and novel features are more clearly understood by reference to the following description taken in connection with the accompanying figures wherein:

FIG. 4A illustrates a side view of a kayak bracket member in accordance with some of the exemplary embodiments;

FIG. 4B illustrates a top view of the kayak bracket member of FIG. 4A;

FIG. 4C illustrates a side view of the kayak bracket member encased in padding in accordance with some of the exemplary embodiments;

FIG. 8A illustrates a side view of a surfboard bracket member of FIG. 1;

FIG. 8B illustrates a surfboard bracket member of FIG. 8A encased in padding in accordance with some of the exemplary embodiments;

DESCRIPTION

Figure 1:
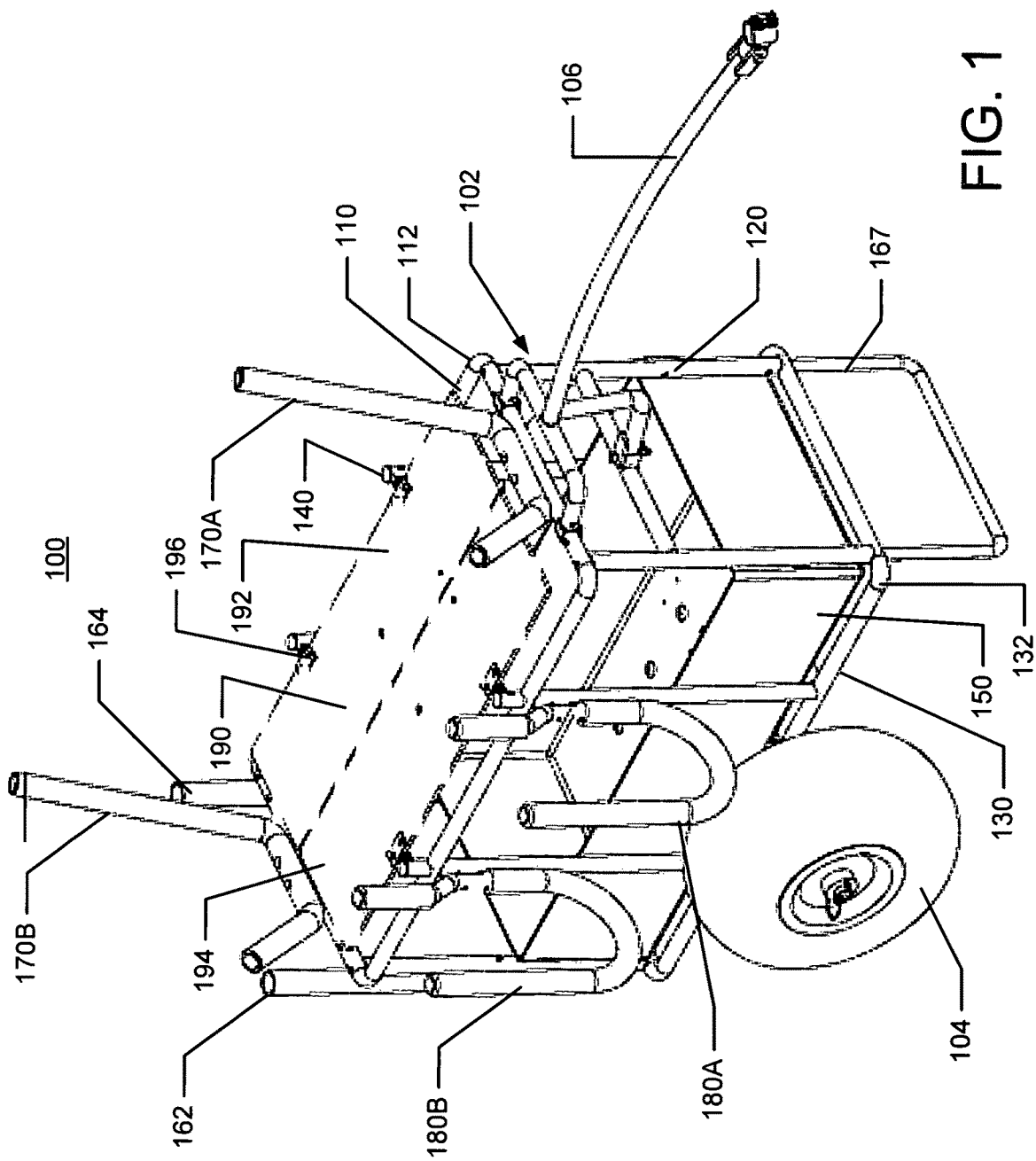
FIG. 1 illustrates a perspective view of a cart system with a plurality of brackets in accordance with some of the exemplary embodiments.

The word "exemplary" is used herein to mean "serving as an example, instance, or illustration." Any configuration or design described herein as "exemplary" is not necessarily to be construed as preferred or advantageous over other configurations or designs. Furthermore, use of the words "present invention" is used herein to convey only some of the embodiments of the invention. For example, the word "present invention" would also include alternative embodiments and equivalent systems and components that one of ordinary skill in the art understands. An example is that the materials used for the exemplary embodiments may be made out of man-made materials, natural materials, and combinations thereof. A further example is that the apparatus or components of the apparatus may be manufactured by machine(s), human(s) and combinations thereof.

Within the descriptions of the figures, similar elements are provided similar names and reference numerals as those of the previous figure(s). Where a later figure utilizes the same element or a similar element in a: different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

Some of the embodiments of the invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

FIG. 1 illustrates a perspective view of a cart system 100 in accordance with some of the exemplary embodiments. The cart system 100 comprises a cart frame 102, a pair of wheels 104, a hitch assembly 106 and a pair of kayak bracket members 170A, 170B and one or more pair of surfboard bracket members 180A-180B. The cart system 100 further includes an option table 190, denoted in dashed line. The table 190 comprises two table sections 192 and 194. Each table section 192 and 194 is hingedly coupled to the cart frame 102 and is configured to rotate between a horizontal state and a vertical state via a plurality of hinge elements 196.

The cart frame 102 comprises a top plurality of horizontal frame members 110 coupled together to form a first plurality of corners 112, and a bottom plurality of horizontal frame members 130 coupled together to form a second plurality of corners 132. The cart frame 102 further comprises a plurality of vertical frame members 120 perpendicularly coupled to the top and bottom plurality of horizontal frame members 110 and 130. The cart system 100 further includes a cart pan 150 configured to line a bottom of the cart frame 102.

The top plurality of horizontal frame members 110 include a plurality of mounting posts 140 projecting above the horizontal plane of the top plurality of horizontal frame members 110. The plurality of mounting posts 140 are aligned with a subset of the plurality of vertical frame members 120 and configured to have attached thereto the plurality of hinge elements 196.

The cart system 100 further includes a fishing pole holder 162 and an umbrella holder 164. The fishing pole holder 162 is constructed and arranged as an elongated tube with an open top configured to support a handle end or the tip end of a fishing pole (NOT SHOWN). The umbrella holder 164 is constructed and arranged as an elongated tube configured to receive a handle end or tip end of a closed umbrella (NOT SHOWN).

In an exemplary embodiment, one or more of the top plurality of horizontal frame members 110 are encased in padding sections, as will be described in more detail herein. The padding sections may include a cushioning, resilient sleeve. The cushioning, resilient sleeve may be made of a closed-cell foam material, rubber material or other cushioning or resilient material that may be applied or coated.

The pair of kayak bracket members 170A, 170B and one or more pair of surfboard bracket members 180A-180B define one or more bracket pairs configured to cradle therein a kayak or a surfboard or in a horizontal orientation, longitudinally, alongside or above the cart frame 102 and in a tilted vertically upright orientation along a shortest axis, as will be described in more detail in relation to FIG. 17. The first and second kayak bracket members 170A and 170B are configured to support a longitudinal axis of a kayak horizontally along a horizontal longitudinal axis of the cart frame 102. The kayak is also tilted in a vertically upright orientation along a shortest axis (as will be described in more detail in relation to FIG. 17) when cradled in first and second kayak bracket members 170A and 170B.

Figure 17:
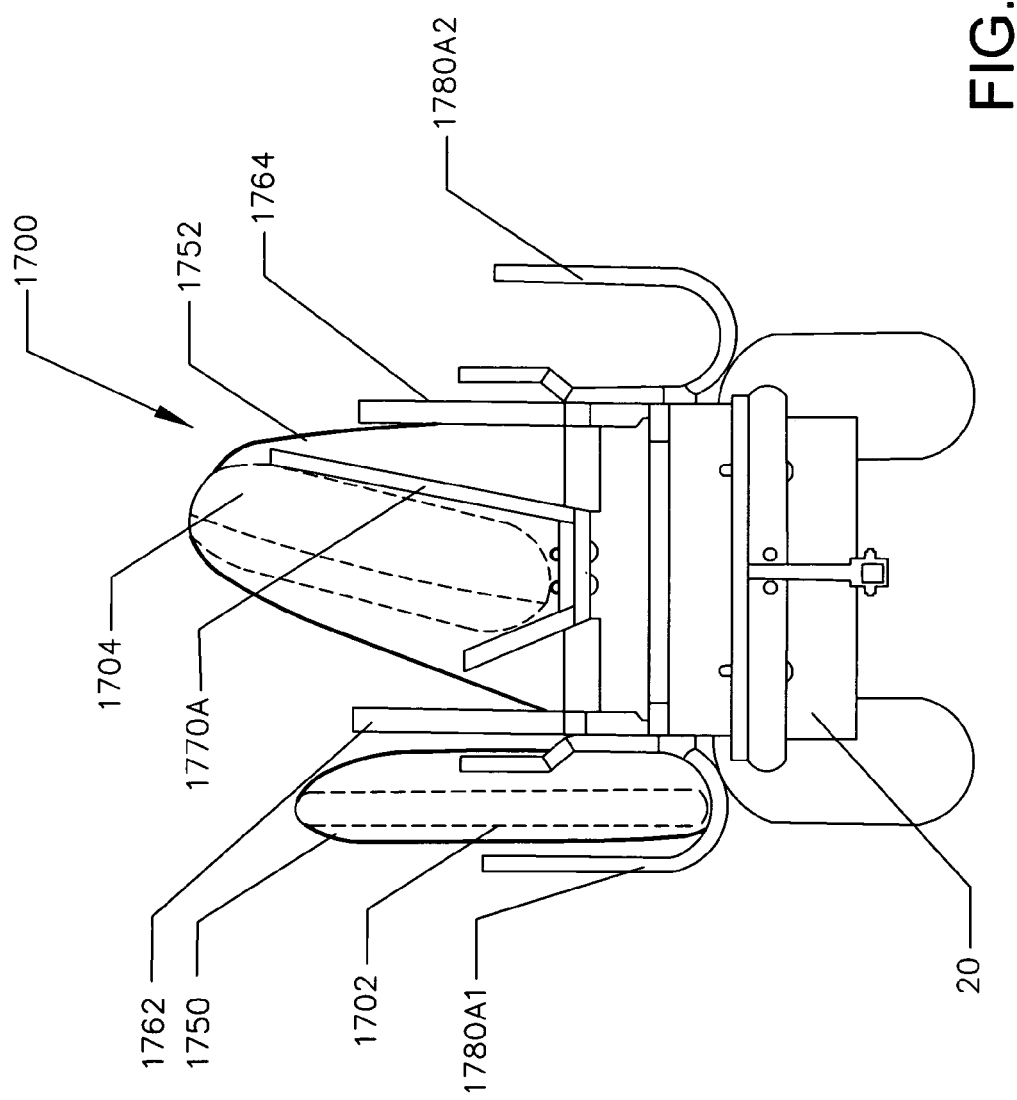
FIG. 17 illustrates a front view of the rack attachment assembly or device of FIG. 16 partially loaded with large beach gear.

As shown in FIG. 17, the cart system 100 secures the kayak and surfboard using cords, cables, bungee cords, or other strapping mechanism.

The front of the cart frame 102 includes a front leveling support 167 to support a front end of the cart frame 102 and prevent the cart frame 102 from tilting downward. The front leveling support 167 is configured to support the front of the cart frame so that the bottom plurality of horizontal frame members 130 are aligned substantially in a horizontal plane.

The cart frame 102 is generally an open cage-like structure. Thus, the cart frame 102 does not have solid walls. The interior of the cart frame 102 can be stuffed with both soft and hard items. More soft items such as towels can be stored and protrude out from the cart frame 102 so that more belongs can be carried. The open cage-like structure allows the cart frame 102 to expand its capacity by having open walls.

The pair of wheels 104 are adapted for use on sand and other terrains. The pair of wheels 104 are rotatably attached to the cart frame 102. In the exemplary embodiment, the pair of wheels 104 are positioned centrally along sides of the cart frame 102. The pair of wheels 104 may be made of natural material, man-made material or a combination of materials. For example, each wheel may be made of plastic, rubber, or other composite materials.

In another exemplary embodiment, the cart system may include three or four wheels.

Figure 2:
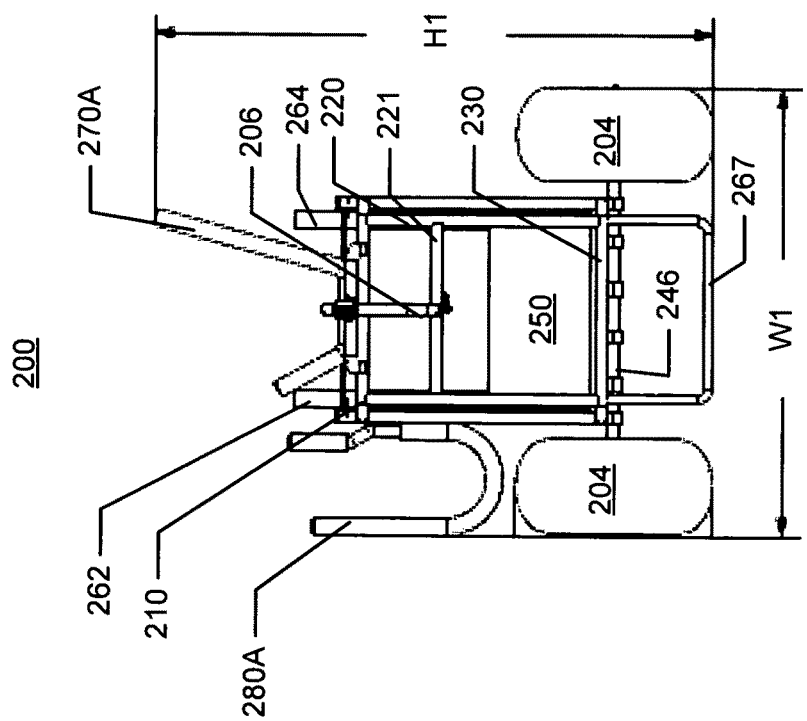
FIG. 2 illustrates a front view of the cart system of FIG. 1.

FIG. 2 illustrates a front view of the cart system 200. In FIG. 2, the cart system 200 further includes an axle 246 which is rotatably coupled to an underside of the cart frame 202. The distal ends of the axle 246 are configured to have mounted thereto the pair of wheels 204. The cart frame 202 has a top plurality of horizontal frame members 210, a bottom plurality of horizontal frame members 230 and vertical frame member 220. The front vertical frame members 220 are linked together additionally by a horizontal cross bar 221. The hinge assembly 206 is shown coupled to the front of the cart frame 202 and specifically to the top plurality of horizontal frame members 210 and the horizontal cross bar 221.

The axle 246 is attached to the underside of the cart frame 202 approximately in the middle thereof. The axle 246 is aligned parallel to the short side of the cart frame 202. The front of the cart frame 202 includes the front leveling support 267. The front leveling support 267 levels the cart frame 202 so that the bottom plurality of horizontal frame members 230 is substantially parallel or aligned with the horizon (horizontal plane). Thus, when the cart system 200 is loaded and detached from a small vehicle (e.g., bicycle or ATV), the cart frame 202 remains essentially level.

In FIG. 2, the bracket member 270A is shown coupled to a front side of the top plurality of horizontal frame members 210. Bracket member 270A has a J-shape, as will be described in more detail in FIGS. 4A-4C, and is configured to support therein a portion of a kayak or canoe. The bracket member 280A is U-shaped and is configured to cradle therein a portion of a surfboard. The bracket member 280A is configured to be attached to one of the vertical support members 220 and will be described in more detail in relation to FIGS. 8A-8B.

In FIG. 2, a bottom of the cart frame 202 is shown lined with a pan 250. A rear side of the cart frame 202 has coupled there the fishing pole holder 262 and the umbrella holder 264. In the exemplary embodiment, the fishing pole holder 262 and the umbrella holder 264 are shown aligned parallel to a vertical plane and in proximity to the rear corners. The fishing pole holder 262 is configured to support a fishing pole vertically upright. Likewise, the umbrella holder 264 is configured to support an umbrella (e.g., beach umbrella) vertically upright. While the exemplary embodiment positions the holder 262 and holder 264 near the rear corners, the holder 262 and 264 may be place in the front end of the cart frame 202 or at other locations as appropriate.

The cart system 200 has a height H2 (measured substantially from the front leveling support 267 or ground to the tip of the bracket member 270A) in the range of 4-5 feet. Nonetheless, shorter or taller cart systems may be used. The width of the cart system 200 from wheel to wheel is approximately 3-4 feet.

Figure 3:
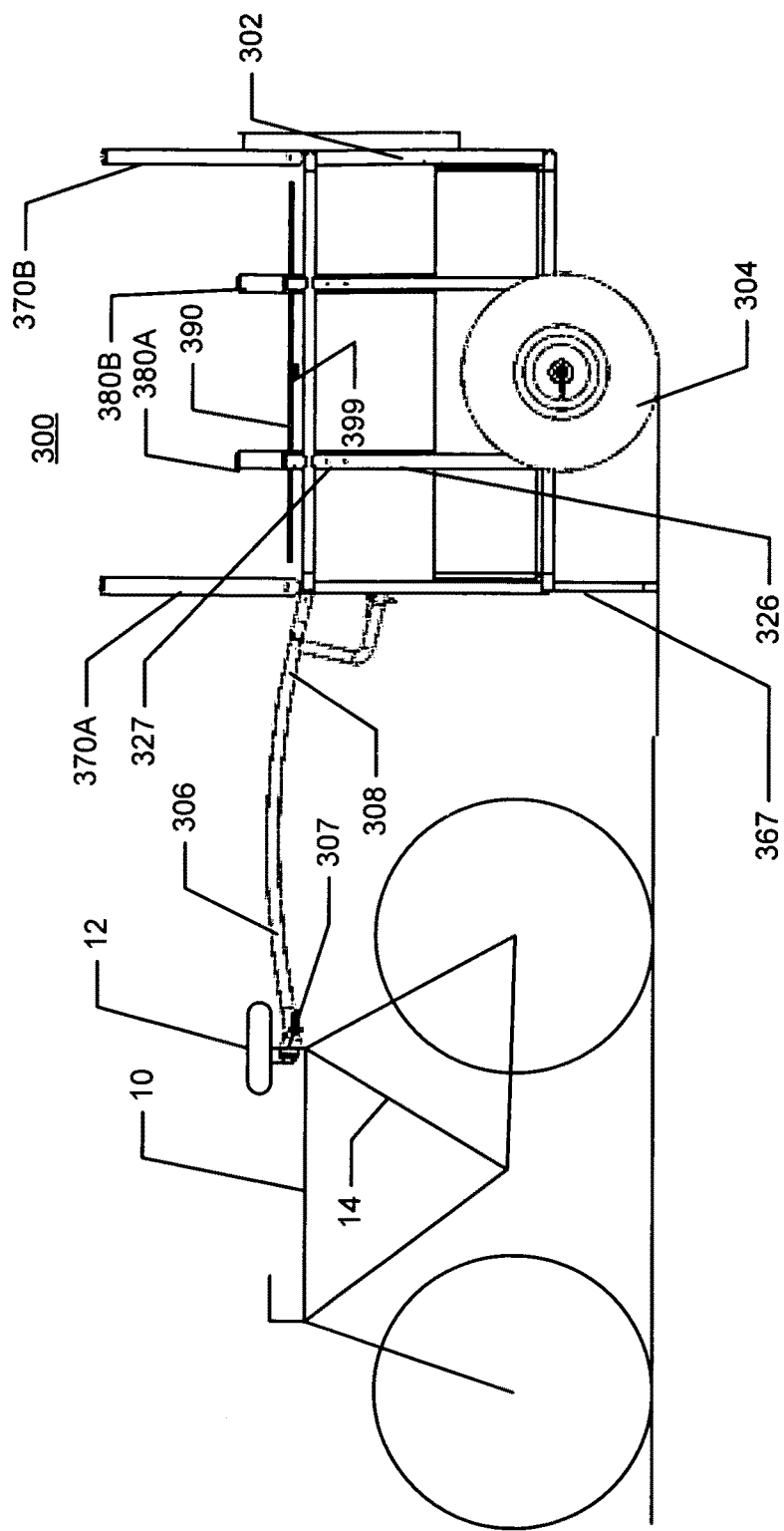
FIG. 3 illustrates a side view of the cart system of FIG. 1 installed on a bicycle in accordance with some of the exemplary embodiments.

FIG. 3 illustrates a side view of the cart system 300 installed on a bicycle 10 in accordance with some of the exemplary embodiments. The cart system 300 is shown attached to the bicycle 10 which includes a seat 12. The seat support is connected between an underside of the seat 12 and to a bike frame 14. The hitch assembly 306 includes a bike coupler 307. The bike coupler 307 is installed and secured around the seat support. As best seen in FIG. 3, the hitch assembly 306 includes an arm 308 which is slightly arched or has a slight convexed curvature. When the bicycle 10 is in motion, the cart system 300 rolls along the ground via the pair of wheels 304 with the bicycle. The length of the arm 308 should be long enough so that the bicycle or other vehicle can turn freely even with a long board, kayak or other bulky items secured to the cart system.

In FIG. 3, the table 390 is shown. A latching mechanism 399 is coupled to an underside of table 390. The latching mechanism 399 is configured to coupled the two sections (FIG. 1) of the table 390 together. As can be readily seen, the vertical supports 326 include at least one aperture 327. Bracket members similar to bracket members 180A and 180B of FIG. 1 may be coupled to the vertical supports 326. A top end of the bracket members 380A and 380B on an opposite side is shown above the table 390.

In operation, it may be practical to mount to each longitudinal side of the cart frame 302 large beach gear such as, without limitation, surfboards, in parallel so that the cart frame 302 is balanced.

While not wishing to be bound by theory, when mounting a kayak or canoe in brackets 370A and 370B, the weight of such kayak or canoe should be balanced along the longitudinal axis of the cart frame 302. For example, if a kayak or canoe is mounted so that the weight is distributed more to the rear end of the cart system 300, the cart system 300 may pivot rearward lifting the front leveling support 367.

With specific reference to FIGS. 4A and 4B, side and top views of a kayak bracket member 470A is shown. Since each kayak bracket member is identical, only one such kayak bracket member 470A will be described in detail. The J-shaped kayak bracket member 470A includes a first angled section 402 coupled to one end of a base (horizontal) section 404. The first angled section 402 forms an obtuse angle with respect to the base (horizontal) section 404.

The J-shaped kayak bracket member 470A further includes a second angled section 408 coupled to another free end of the base (horizontal) section 404. The second angled section 408 forms an obtuse angle with respect to the base (horizontal) section 404. The base (horizontal) section 404 includes through holes 410 to attach the kayak bracket member 470A to the front side of the top plurality of horizontal frame members 210 (FIG. 2).

FIG. 4C illustrates a side view of the kayak bracket member 470A encased in padding 420 in accordance with some of the exemplary embodiments. The padding 420 includes padding sections 422, 424 and 428. The padding 420 may be a unitary structure or multiple separate and divisible sections. In a still further embodiment, one or more padding sections 422, 424 and 428 may be omitted. In an exemplary embodiment, the first angled section 402, the base (horizontal) section 404, and second angled section 408 are surrounded by padding sections 422, 424 and 428, respectively. In an exemplary embodiment, padding sections 422, 424 and 428 include a cushioning, resilient sleeve. The cushioning, resilient sleeve may be made of a closed-cell foam material, rubber material or other cushioning or resilient material that may be applied thereto.

Figure 5:
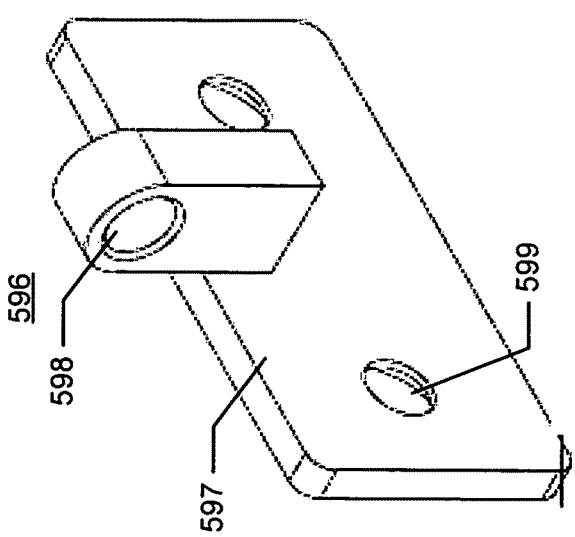
FIG. 5 illustrates a hinge element of the cart system of FIG. 1.

FIG. 5 illustrates a hinge element 596 for use with the cart system 100. The hinge element 596 includes a plate 597 having one or more apertures 599 for fastening the plate 597 to a surface of a table section 192 or 194 (FIG. 1). The hinge element 596 further includes a pivot connector 598 configured to be affixed to mounting posts 140 (FIG. 1) configured to attach the pivot connector 598 thereto. The pivot connector 598 is configured to receive a pivot pin associated with the mounting posts 140. Removal of the hinge element 596 from the mounting posts 140 allows the table sections 192 and 194 to be removed. Thus, the table may be selectively removed.

Figure 6:
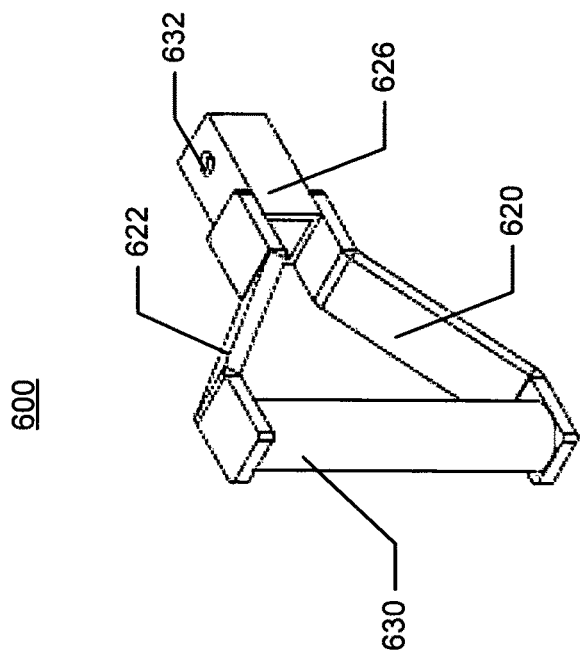
FIG. 6 illustrates a handle for the cart system in accordance with some of the exemplary embodiments.

FIG. 6 illustrates a handle 600 for the cart system in accordance with some of the exemplary embodiments. The handle 600 is similar to a wagon handle. The handle includes a Y-shaped structure having a base 626 and two angled legs 620 and 622. On distal end of legs 620 and 622 are coupled to base 626 having an attachment mechanism 632 for attachment to one end (bike coupler 307) of the hinge assembly (e.g., 106, 206, and 306). The legs 620 and 622 are linked together at another distal end via handle bar 630. The handle bar 630 is configured to be grasped by a hand so that the cart system can be manually pulled. The handle 600 is removable.

Figure 7:
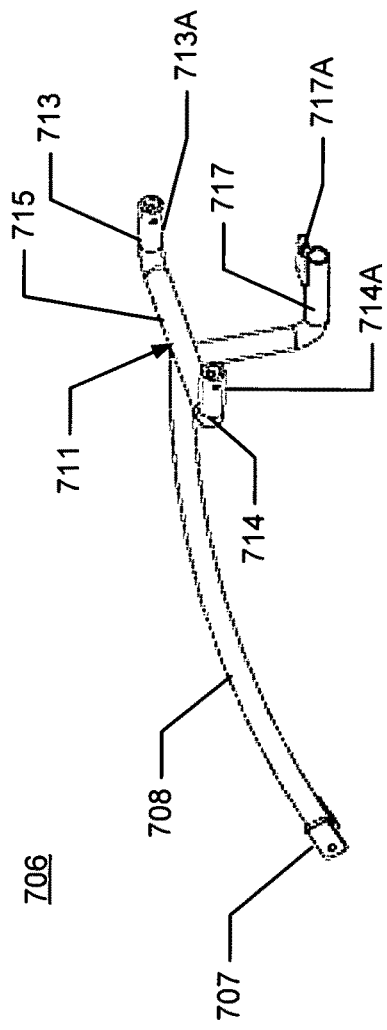
FIG. 7 illustrates a hitch assembly for the cart system of FIG. 1.

FIG. 7 illustrates a hitch assembly 706 for the cart system (e.g., 100, 200, and 300) in accordance with some exemplary embodiments. The hitch assembly 706 includes a bike coupler 707. The bike coupler 707 is installed and secured around a seat support, as best seen in FIG. 3. The hitch assembly 706 includes an arm 708 which is slightly arched or has a slight convexed curvature. The bike coupler 707 is configured to selectively fasten and be clamped around the seat support. The hitch assembly 706 further includes a cart frame coupler 711. The cart frame coupler 711 includes a U-shaped member having legs 713 and 714 coupled together via cross member 715. The cart frame coupler 711 further includes an L-shaped member 717 extending perpendicularly from the center of cross member 715. The free end of legs 713 and 714 include attachment mechanism 713A and 714A, respectively, configured to attach legs 713 and 714 to the front of the top plurality of horizontal frame members 110 of the cart frame (e.g., 102). The free end of the L-shaped member 717 includes another attachment mechanism 717A configured to attach the L-shaped member to the horizontal cross bar (e.g., 221) of the cart frame. The attachment mechanisms 713A, 714A and 717A may include couplers or fasteners with pins, screws, bolts, clamps, etc. As best seen in FIG. 3, the L-shaped member 717 does not have right angles with respect to the horizontal cross bar (e.g., 221) of the cart frame.

FIG. 8A illustrates a surfboard bracket member 880A for use with any one of the cart systems or rack assemblies described herein. Since each surfboard bracket member is essentially the same, only one such bracket member 880A will be described in detail. The surfboard bracket member 880A is configured to be attached to the cart frame (e.g., 102) via fasteners. A first surfboard bracket member 880A is attached to a front of the cart frame (e.g., 102) and a second surfboard bracket member (e.g., 180B) is also attached to the cart frame and in spaced relation with respect to the first surfboard bracket member 880A. The second surfboard bracket member (e.g., 180B) is attached to a rear end of the cart frame.

The first and second surfboard bracket members are configured to support a surfboard horizontally along a horizontal longitudinal axis of the cart frame in the tilted vertically upright orientation along the shortest axis of the surfboard, as best seen in FIG. 17.

The surfboard bracket member 880A is U-shaped. The surfboard bracket member 880A has a U-shaped support structure. The surfboard bracket member 880A includes a first leg 804, an arched (concaved) section 806, and a second leg 808. The second leg 808 includes a lower section 812 and a top section 816 having a longitudinal axis which is offset but parallel with the longitudinal axis of the lower section 812. The lower section 816 and the top section 816 are joined together via a joint section 814. The joint section 814 is angled in the directions of the first leg 804. The angling may serve to hide the head of a fastener in through hole or aperture 812A.

FIG. 8B illustrates a surfboard bracket member of FIG. 8A encased in padding sections 822, 824, 826 and 828 in accordance with some of the exemplary embodiments. The padding sections 804, 806, 812, 814 and 816 are attached to at least some of the first leg 804, the arched (concaved) section 806, and the second leg 808.

Figure 9:
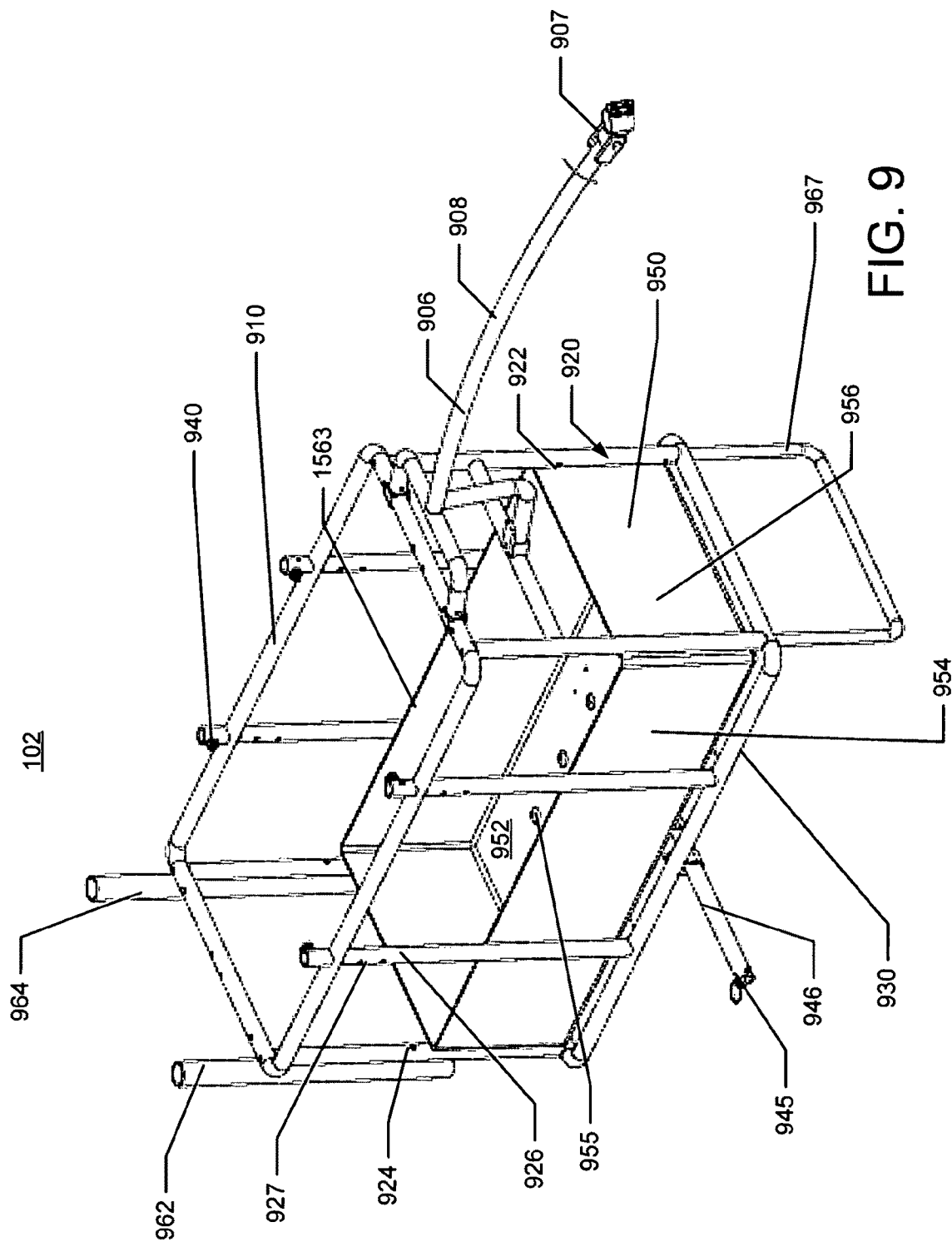
FIG. 9 illustrates a perspective view of a cart frame of FIG. 1.

With specific reference to FIG. 9, a perspective view of a cart frame 902 in accordance with some of the exemplary embodiments is shown. The cart frame 902 comprises a top plurality of horizontal frame members 910, a bottom plurality of horizontal frame members 930 and a plurality of vertical frame members 920 coupled to the top and bottom plurality of horizontal frame members 910 and 930.

In general, there are four top horizontal frame members 910 and four bottom horizontal frame members 930.

Figure 14:
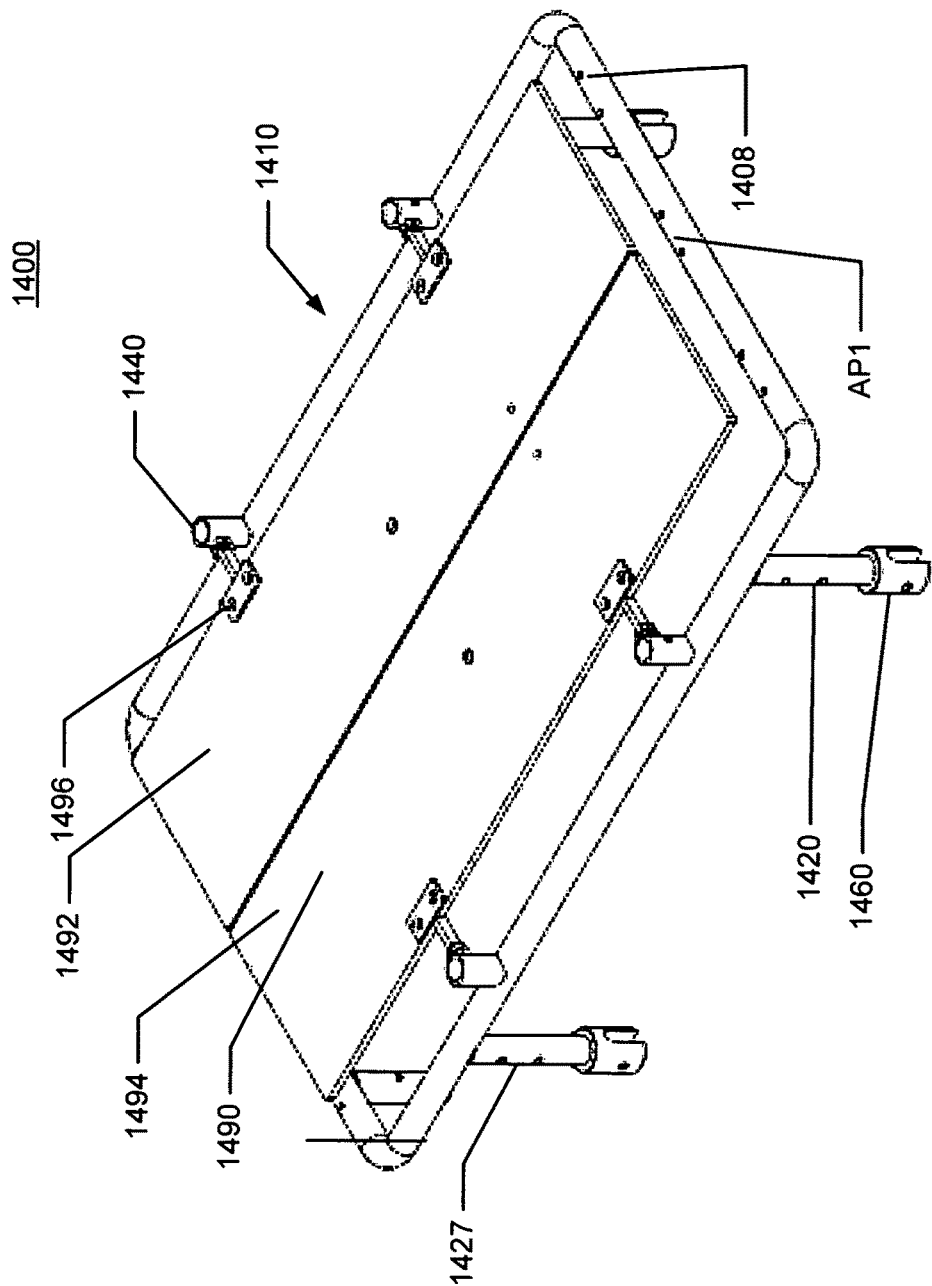
FIG. 14 illustrates a perspective view of the rack attachment assembly of FIG. 13.

The cart frame 902 includes vertical mounting posts 940 for attachment of the table (e.g., 190). The vertical mounting posts 940 are aligned with a subset of the plurality of vertical frame members 920 and specifically intermediate vertical frame members 926. Nonetheless, the vertical mounting posts 940 may be displaced with respect to the location of the vertical frame members 926, such as shown in FIG. 14.

The cart frame 902 aligns the top plurality of horizontal frame member 910 and the bottom plurality of frame members 930 in vertical and parallel spaced relation separated by a length (or portion of the length) of the plurality of vertical frame members 920. The plurality of vertical frame members 920 include a pair of front vertical frame members 922 and a pair of rear vertical frame members 924. The plurality of vertical frame members 920 also include intermediate vertical frame members 926.

In an exemplary embodiment, the plurality of horizontal frame member 910 may include horizontal post, columns or bars comprised of aluminum tubes, metal tubes, or other tubes of other durable materials. In lieu of a hollow frame member, one or more of the frame members may be solid. In an exemplary embodiment, one or more the frame members (horizontal or vertical) are covered or has applied thereto a cushioning, resilient sleeve. The cushioning, resilient sleeve may be made of a closed-cell foam material, rubber material or other cushioning material that may be applied thereto.

The axle 946 is rotatably coupled to an underside of the bottom plurality of horizontal frame member 930. The distal ends 945 are configured to have mounted thereto the pair of wheels (e.g., 104). The cart frame 902 has a single axle 946 for a two wheel configuration. However, the cart frame 902 may include two axles for a three or four wheel configuration.

In the exemplary embodiment, a portion of the cart frame 902 is lined with a pan 950. The pan 950 has a bottom floor 952 and four perimeter side walls 954. The side walls 954 are configured to fit within the cart frame 902 and rest upon the bottom plurality of horizontal frame member 930.

In the exemplary embodiment, the bottom floor 952 includes a plurality of holes 955 to permit sand, water or other small debris to fall through the plurality of hole 955. The pan 950 may be removable. The fishing pole and umbrella holders 962 and 964 are shown attached to the rear vertical frame members 924.

Figure 10:
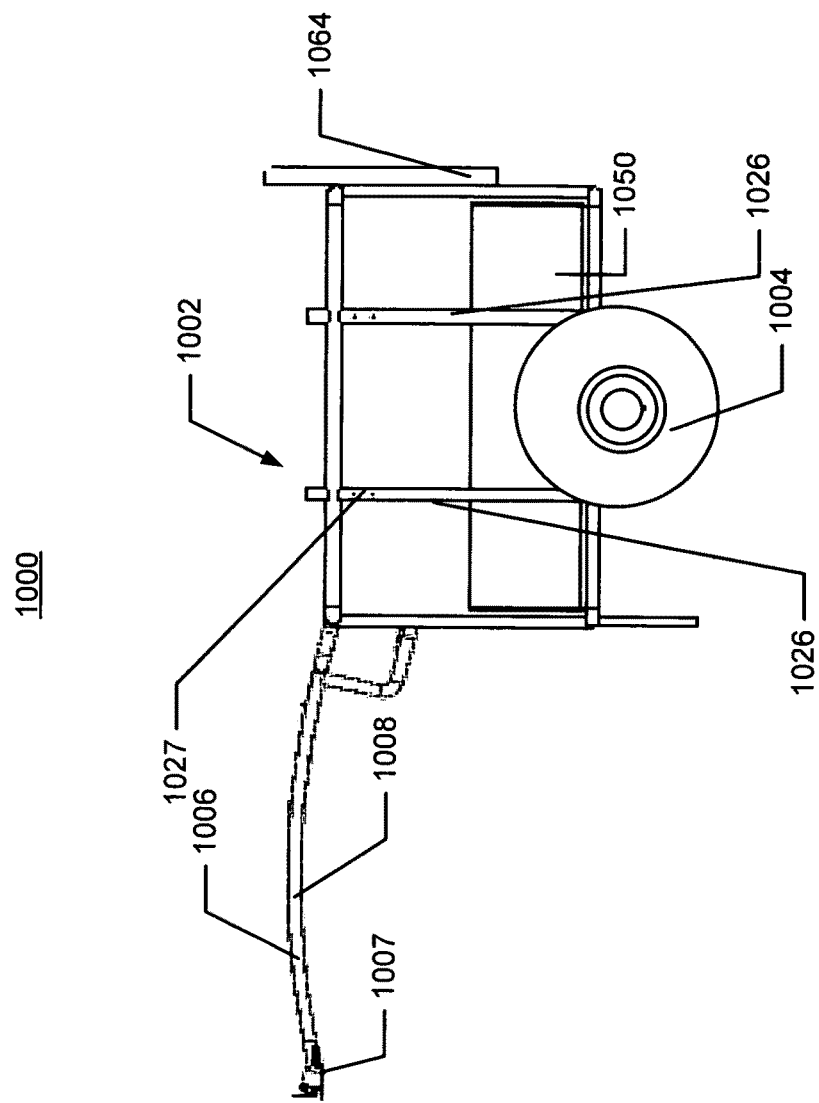
FIG. 10 illustrates an side view of the cart system 1000 with all bracket members and other accessories (e.g., table 190, 390) removed in accordance with some exemplary embodiments.

FIG. 10 illustrates a side view of the cart system 1000 with all bracket members and other accessories (e.g., table 190, 390) removed in accordance with some exemplary embodiments. The cart system 1000 includes a removable hitch assembly 1006. The hitch assembly 1006 includes a bike coupler 1007. The bike coupler 1007 is configured to be installed and secured around a seat support of a bicycle. Nonetheless, the handle 600 of (FIG. 6) may be substituted for the bike coupler 1007. As best seen in FIG. 10, the hitch assembly 1006 includes an arm 1008 which is slightly arched or has a slight convexed curvature. When the bicycle is in motion, the cart system 1000 rolls along the ground via the pair of wheels 1004 with the bicycle.

In FIG. 10, as can be readily seen, the vertical supports 1026 include at least one aperture 1027 for attachment of bracket members. However, all bracket members are removed. The frame cart 1002 is lined with cart pan 1050. Thus, the cart system 1000 is capable of carrying or hauling a variety of articles to the beach. In the exemplary embodiment, the cart system 1000 includes a fishing pole holder (NOT SHOWN) and an umbrella holder 1064. Nonetheless, one or both of the holders may be omitted.

Figure 11:
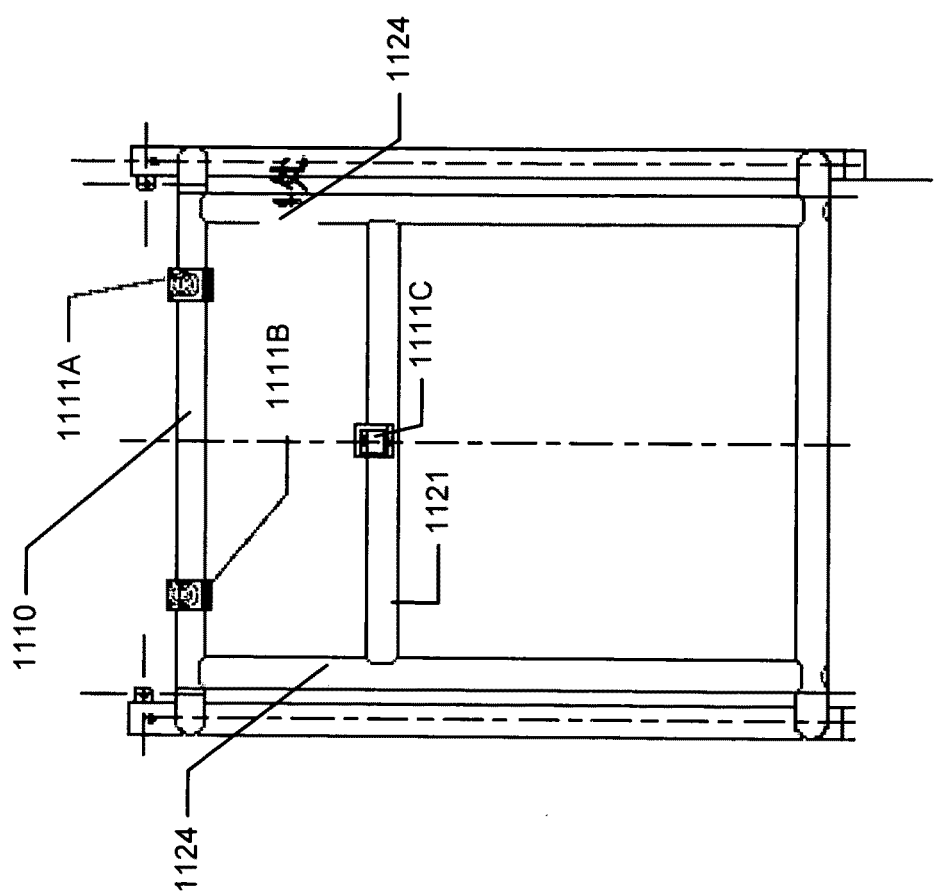
FIG. 11 illustrates a front view of the cart frame of FIG. 9 with the hitch assembly removed.

FIG. 11 illustrates a front view of the cart frame with the hitch assembly removed. The front of the top plurality of horizontal frame members 1110 includes first and second frame couplers 1111A and 1111B arranged in space relation. The first and second frame couplers 1111A and 1111B coupled and fastened to attachment mechanism 713A and 714A, respectively, of legs 713 and 714. Parallel to the front of the top plurality of horizontal frame members 1110 is the horizontal cross bar 1121. The horizontal cross bar 1121 is coupled between and perpendicular to vertical frame members 1124. A third frame coupler 1111C is coupled to and in the center of the horizontal cross bar 1121. The third frame coupler 111C is coupled and fastened to attachment mechanism 717A of the hitch assembly 706. The frame couplers may include couplers or fasteners with pins, screws, bolts, clamps, etc.

In an exemplary embodiment, the first, second and third frame couplers 1111A, 1111B and 1111C are installed after anodizing the cart frame (e.g., 102). Nonetheless, the frame couplers may be installed before anodizing.

Figure 12:
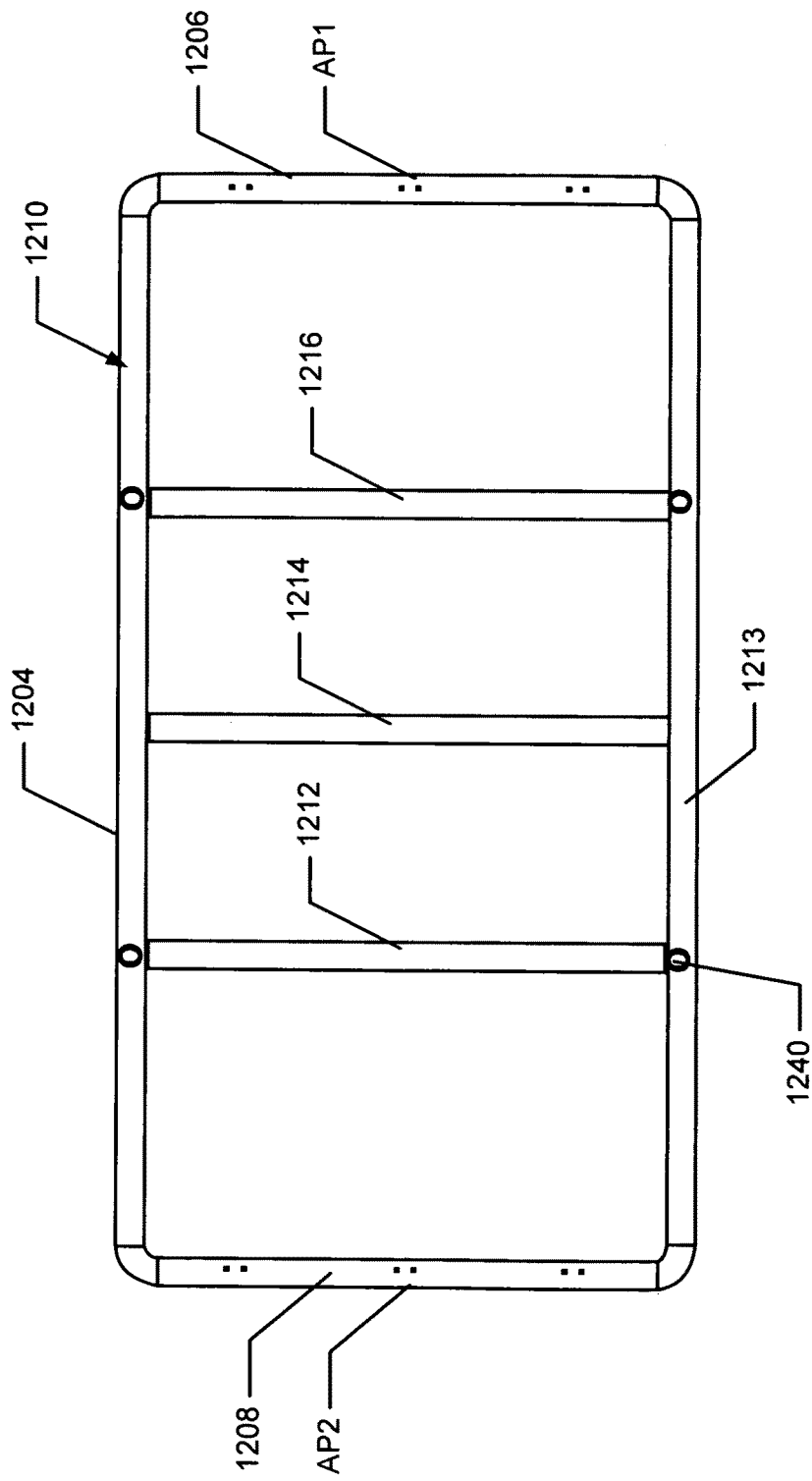
FIG. 12 illustrates a top view of the cart frame in accordance with some exemplary embodiments.

FIG. 12 illustrates a top view of the cart frame 1202 in accordance with some exemplary embodiments. The top plurality of horizontal frame members 1110 includes first and second longitudinal frame side members 1204 and 1213 which are parallelly aligned in space relation along a first longitudinal direction. The top plurality of horizontal frame members 1110 further includes first and second short frame side members 1206 and 1208. The first and second short frame side members 1206 and 1208 which are parallel to each other and perpendicularly coupled to the first and second longitudinal frame side members 1204 and 1213 to form a rectangle. Although a rectangle shape is described other geometric shapes such as a square may be formed.

The circles denoted by 1240 are the mounting posts 140 (FIG. 1). The one or more cross supports 1212, 1214 and 1216 are part of the bottom plurality of horizontal frame members (e.g., 130) to reinforce the space relationship between the first and second longitudinal frame side members of the bottom plurality of horizontal frame members (e.g., 130). The one or more cross supports 1212, 1214 and 1216 are perpendicularly coupled to the first and second longitudinal frame side members.

The first and second short frame side members 1206 and 1208 each have formed therein one or more aperture pairs AP1 and AP2, respectively. In the exemplary embodiment, the center aperture pair AP1 of the first short frame side member 1206 is configured to attach or mount thereto the first kayak bracket member 170A (FIG. 1). In the exemplary embodiment, the center aperture pair AP2 of the second short frame side member 1208 is configured to attach or mount thereto the second kayak bracket member 170B (FIG. 1). The first and second short frame side members 1206 and 1208 have more than one aperture pair. Thus, the attachment of the kayak bracket member 170A (FIG. 1) may be moved from the center location illustrated in the exemplary embodiments.

Figure 13:
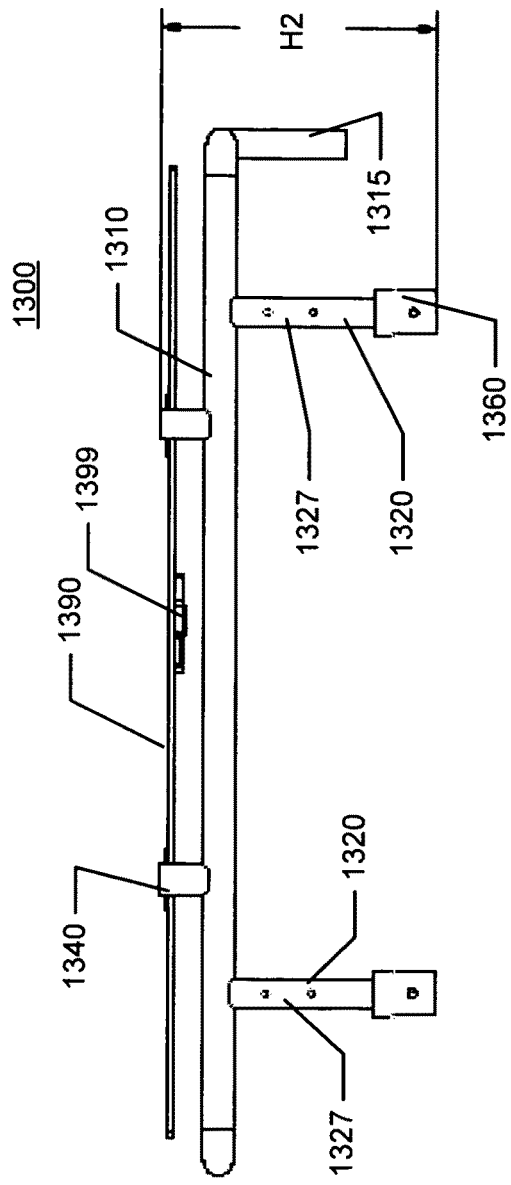
FIG. 13 illustrates a side view of a rack attachment assembly for attachment to a cart in accordance with some exemplary embodiments.

FIG. 13 illustrates a side view of a rack attachment assembly or device 1300 for attachment to a cart in accordance with some exemplary embodiment. The rack attachment assembly or device 1300 comprises a plurality of horizontal frame members 1310 and a plurality of vertical frame members 1320 perpendicularly coupled to the plurality of horizontal frame members 1310. The horizontal frame members 1310 serves as a rack frame. Free ends of the plurality of vertical frame members 1320 have coupled thereto cart connectors 1360. In the exemplary embodiment, the cart connectors 1360 are fastened, mounted, bolted, or screwed to suitable mounts or structures of a separate cart. There are four vertical frame members 1320 which include apertures 1327. In the exemplary embodiment, the vertical frame members 1320 are not aligned with the corners of the plurality of horizontal frame members 1310. However, the vertical frame members 1320 may be positioned at said corners. The side vertical frame members 1320 may have removable attached thereto one or more pair of surfboard bracket members (e.g., 180A, 180B).

One or more of the plurality of horizontal frame members 1310 may be encased in padding sections (NOT SHOWN).

The rack attachment assembly or device 1300 further includes a table 1390 hingedly coupled to the plurality of horizontal frame members 1310 at mounting posts 1340. The table sections (e.g., 1492 and 1464) of FIG. 14 are configured to be locked in a horizontal position via locking mechanism or latch 1399. The table 1390 when deployed can be used as a support surface to place beverages, food or other times. The table 1390 is configured to be opened such that both table sections are vertically upright so that the interior of a cart can be accessed to remove items.

While not wishing to be bound by theory, the table 1390 also provides a cover for the cart to protect items stored in the cart from rain while at the beach or other recreational area.

The exemplary embodiment of the rack attachment assembly or device 1300 includes a supplemental vertical support 1315 which is not shown to connect to the cart. However, other accessories, such as a fishing holder or umbrella holders may be selectively attached.

The height H2 of the rack attachment assembly or device 1300 is measured from the top of mounting posts 1340 to the bottom of cart connectors 1360. The height H2 is approximately 9-12 inches. However, other heights may be used.

FIG. 14 illustrates a perspective view of a rack attachment assembly or device for attachment to a cart in accordance with some exemplary embodiment. The rack attachment assembly or device 1400 comprises a plurality of horizontal frame members 1410 coupled together to in a rectangular shape, box shape, square shape or other geometrical shape. The horizontal frame members 1410 serves as a rack frame.

The rack attachment assembly or device 1400 further comprises a plurality of vertical frame members 1420 perpendicularly coupled to the plurality of horizontal frame members 1410. Free ends of the plurality of vertical frame members 1420 have coupled thereto cart connectors 1460. In the exemplary embodiment, the cart connectors 1463 are fastened, mounted, bolted, or screwed to a separate cart. There are four vertical frame members 1420 which include apertures 1427. In the exemplary embodiment, the vertical frame members 1420 are not aligned with the corners of the plurality of horizontal frame members 1410. However, the vertical frame members 1420 may be positioned at said corners. The side vertical frame members 1420 may have removable attached thereto one or more pair of surfboard bracket members (e.g., 180A, 180B).

One or more of the plurality of horizontal frame members 1410 may be encased in padding sections (NOT SHOWN).

The rack attachment assembly or device 1400 further includes a table 1490. The table 1490 comprises two table sections 1492 and 1494. Each table section 1492 and 1494 is hingedly coupled to the plurality of horizontal frame members 1410 at mounting posts 1440. The table sections 1492 and 1464 are configured to rotate between a horizontal state and a vertical state via a plurality of hinge elements 1496.

The front horizontal frame member 1408 has pairs of apertures AP1. Likewise, the rear horizontal frame member has apertures. The pair of apertures AP1 on the front and apertures on the rear horizontal frame member may be used to selectively attach a pair of kayak bracket members (e.g., 170A and 170B).

Figure 15:
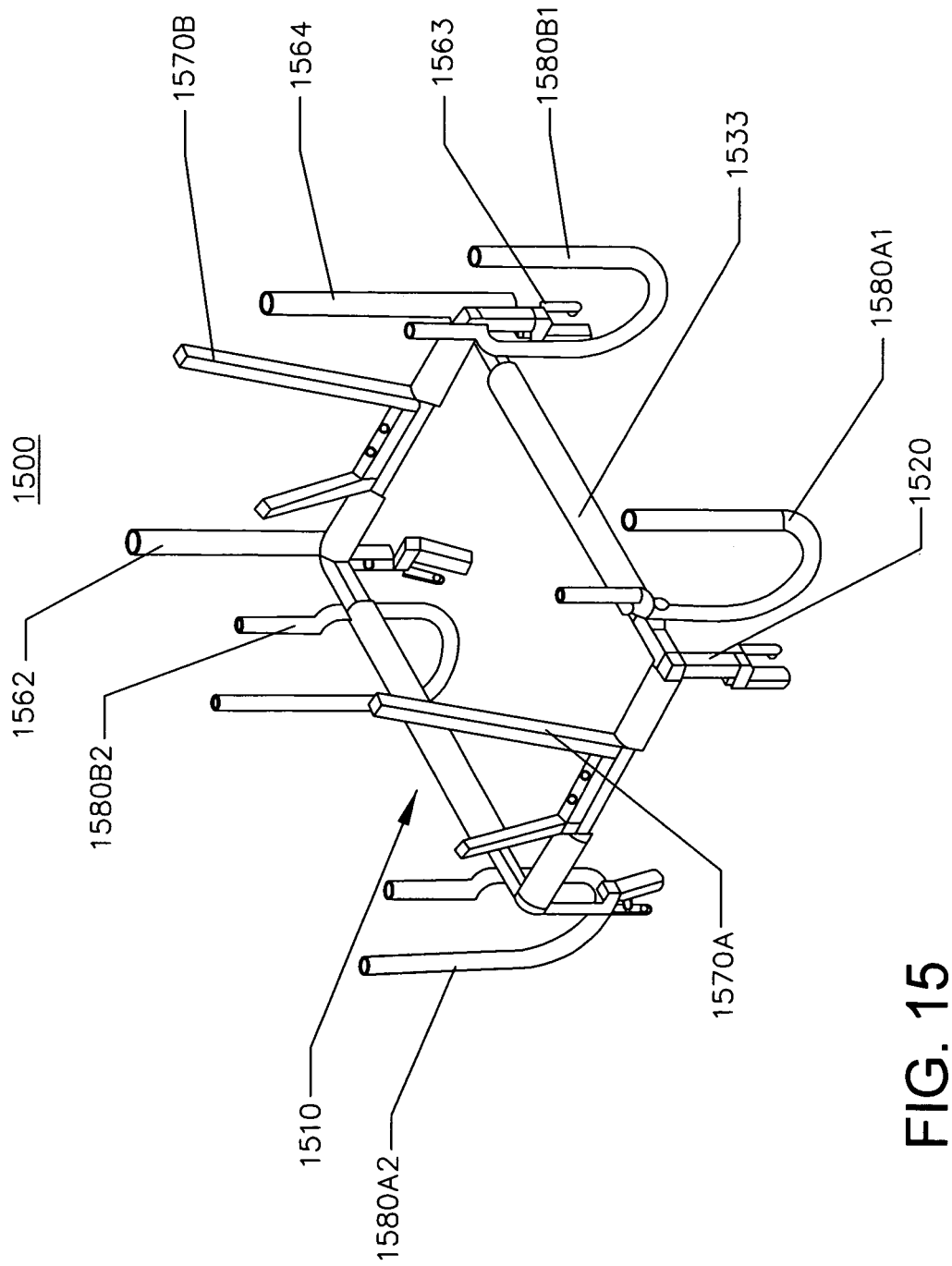
FIG. 15 illustrates a perspective view of another rack attachment assembly for attachment to a cart in accordance with some exemplary embodiment.

FIG. 15 illustrates a perspective view of another rack attachment assembly for attachment to a cart in accordance with some exemplary embodiment. The rack attachment assembly or device 1500 comprises a plurality of horizontal frame members 1510 coupled together to in a rectangular shape and serves as a rack frame. The longitudinal sides of the horizontal frame members 1510 have coupled thereto one or more pair of surfboard bracket members 1580A1-1580A21 and 1580B1-1580B2. The pair of surfboard bracket members 1580A1-1580A21 and 1580B1-1580B2 have a generally U-shape as previously described in relation to FIGS. 8A-8B.

The rack attachment assembly or device 1500 further includes a pair of kayak bracket members 1570A and 1570B coupled to front and rear horizontal frame members of the plurality of horizontal frame members 1510. The pair of kayak bracket members 1570A and 1570B have a generally J-shape as previously described in relation to FIGS. 4A-4C.

The rack attachment assembly or device 1500 further comprises a plurality of vertical frame members 1520 perpendicularly coupled to the plurality of horizontal frame members 1510. Free ends of the plurality of vertical frame members 1520 have coupled thereto cart connectors 1563. In the exemplary embodiment, the cart connectors 1563 are clamping members to clamp to a top edge (or in proximity to the top edge) of a separate cart, as will be described in relation to FIG. 16.

The rack attachment assembly or device 1500 further includes a fishing pole holder 1562 and an umbrella holder 1564. The fishing pole holder 1562 is constructed and arranged as an elongated tube with an open top configured to support a handle end or the tip end of a fishing pole (NOT SHOWN). The umbrella holder 1564 is constructed and arranged as an elongated tube configured to receive a handle end or tip end of a closed umbrella (NOT SHOWN).

In an exemplary embodiment, one or more of the plurality of horizontal frame members 1510 are encased in padding sections 1533. The padding sections may include a cushioning, resilient sleeve. The cushioning, resilient sleeve may be made of a closed-cell foam material, rubber material or other cushioning or resilient material that may be applied or coated. The surfboard, kayak or canoe are strapped in the bracket members, as shown in FIG. 17, using cords, cables, bungee cords, or other strapping mechanism. The horizontal frame member 1510 can be used as support for connectors such as hooks at the ends of the strapping mechanism.

Figure 16:
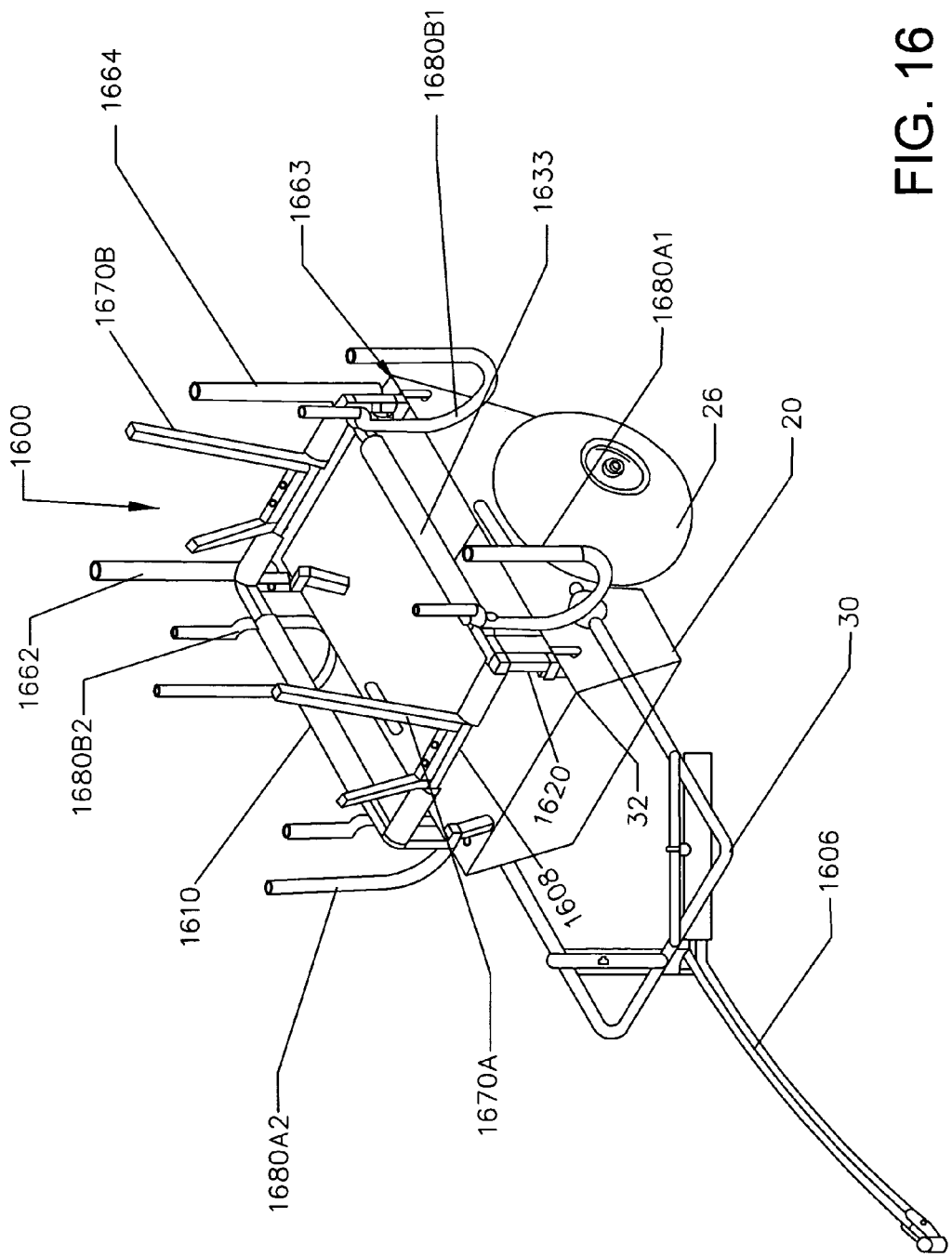
FIG. 16 illustrates the rack attachment assembly attached to a cart in accordance with some of the exemplary embodiments.

FIG. 16 illustrates the rack attachment assembly or device 1600 attached to a cart 20 in accordance with some of the exemplary embodiments. The rack attachment assembly or device 1600 comprises a plurality of horizontal frame members 1610 coupled together to in a rectangular shape, box shape or square shape. The longitudinal sides of the horizontal frame members 1610 have coupled thereto one or more pair of surfboard bracket members 1680A1-1680A21 and 1680B1-1680B2. The pair of surfboard bracket members 1680A1-1680A21 and 1680B1-1680B2 have a generally U-shape as previously described in relation to FIGS. 8A-8B. The surfboard bracket members are configured to be attached to right and left sides of the cart 20 or rack attachment assembly or device 1600.

The rack attachment assembly or device 1600 further includes a pair of kayak bracket members 1670A and 1670B coupled to front and rear horizontal frame members of the plurality of horizontal frame members 1610. The pair of kayak bracket members 1670A and 1670B have a generally J-shape as previously described in relation to FIGS. 4A-4C. The kayak bracket members 1670A is shown attached to a front horizontal frame member 1608 via fasteners such as screws, bolts, etc. The horizontal frame members 1610 serve as a rack frame.

The rack attachment assembly or device 1600 further comprises a plurality of vertical frame members 1620 perpendicularly coupled to the plurality of horizontal frame members 1610. Free ends of the plurality of vertical frame members 1620 have coupled thereto cart connectors 1663. In the exemplary embodiment, the cart connectors 1663 are clamping members to clamp to a top edge 32 (or in proximity to the top edge) of the cart 20.

The rack attachment assembly or device 1600 further includes fishing pole holder 1662 and an umbrella holder 1664. The fishing pole holder 1662 is constructed and arranged as an elongated tube with an open top configured to support a handle end or the tip end of a fishing pole (NOT SHOWN). The umbrella holder 1664 is constructed and arranged as an elongated tube configured to receive a handle end or tip end of a closed umbrella (NOT SHOWN).

In an exemplary embodiment, one or more of the plurality of horizontal frame members 1610 are encased in padding sections 1633. The padding sections may include a cushioning, resilient sleeve. The cushioning, resilient sleeve may be made of a closed-cell foam material, rubber material or other cushioning or resilient material that may be applied or coated. Each horizontal frame member 1610 may be wrapped in one or more padding sections 1633.

In the exemplary embodiment, the size of the plurality of horizontal frame members 1610 tracks the size and shape of the top opening into the bed of the cart 20. The fishing pole holder 1662 and an umbrella holder 1664 should be positioned to reside above the top edge 32 of cart 20. In another exemplary embodiment, the fishing pole holder 1662 and an umbrella holder 1664 should reside vertically along a rear of the cart 20. In other words, the location of the fishing pole holder 1662 and an umbrella holder 1664 should not interfere with installation if the assembly or device 1600 on the cart 20.

The cart 20 is a separate wheeled cart with wheels 26. Wheels 26 should be configured for sand and beach use. The cart 20 further includes a cart handle 30. The cart handle 30 can be used to manually pull the cart 20 with the loaded rack attachment assembly or device 1600. In the exemplary embodiment, the rack attachment assembly or device 1600 includes a hitch assembly 1606 configured to clamp or attach to the cart handle 30. The hitch assembly 1606 will be described in more detail in relation to FIG. 18.

FIG. 17 illustrates a front view of the rack attachment assembly or device 1700 partially loaded with large beach gear. The rack attachment assembly or device 1700 is shown attached to cart 20. The rack attachment assembly or device 1700 is shown with a surfboard 1702, denoted in dashed lines, cradled in the pair of surfboard bracket members on the left side (only 1780A1) shown. The other pair of surfboard bracket members (only 1680A2 shown) is not loaded with a surfboard. However, a surfboard may be cradled therein. A bungee cord 1750 is shown strapping the surfboard 1702 to the horizontal frame members (e.g., 1610).

The rack attachment assembly or device 1700 is shown with a kayak 1704, denoted in dashed lines, cradled in a pair of kayak bracket members (only 1770A shown). The kayak 1704 is strapped with a bungee cord 1752 to the horizontal frame members (e.g., 1610).

The rack attachment assembly or device 1700 further includes fishing pole holder 1762 and an umbrella holder 1764.

Figure 18:
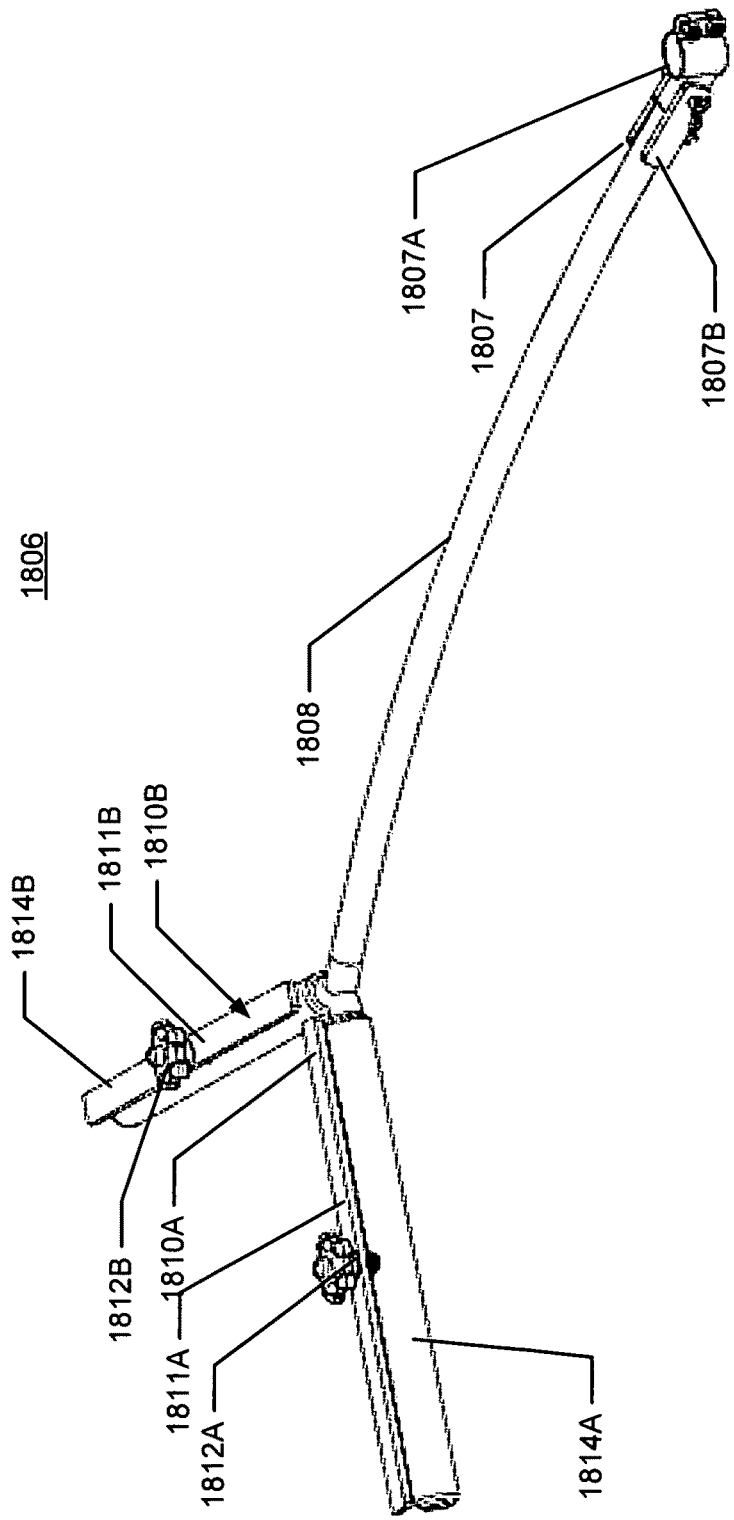
FIG. 18 illustrates a perspective view of another hitch assembly in accordance with some of the exemplary embodiments.

FIG. 18 illustrates a perspective view of a hitch assembly 1806 in accordance with some of the exemplary embodiments. The hitch assembly 1806 includes a Y-shaped configuration having first and second angled arms 1810A and 1810B and a main bar 1808 joining the arms 1810A and 1810B together. The main linking bar 1808 is elongated and has a convexed curvature. A free end of the main linking bar 1808 has a bike coupler 1807 coupled thereto for attachment under a seat of a bicycle, as best seen in FIG. 3. The bike coupler 1807 includes a bar coupler 1807B attached to the structure of the bar 1808. The bike coupler 1807 further includes clamp 1807A configured to be clamped around a seat support of a bicycle under the seat.

The arms 1810A and 1810B are configured to clamp, mount, or affix to cart handle 30 of FIG. 16. The arms 1810A include a top support 1811A, a bottom support 1814A and a tightening knob 1812A. A first portion of the cart handle 30 is coupled between the top support 1811A and the bottom support 1814A. The first portion is clamped between the top support 1811A and the bottom support 1814A as the tightening knob 1812A is tightened.

The arm 1810B includes a top support 1811B, a bottom support 1814B and a tightening knob 1812B. A second portion of the cart handle 30 is coupled between the top support 1811B and the bottom support 1814B. The second portion is clamped between the top support 1811B and the bottom support 1814B as the tightening knob 1812B is tightened.

The cart handle 30 (FIG. 16) has two legs linked together with a crossbar of the handle 30. The arm 1810A of the hitch assembly 1806 clamps to one leg and a portion of the crossbar. The arm 1810B of the hitch assembly 1806 clamps to the other leg and a portion of the crossbar of handle 30.

In the exemplary embodiment, the bottom supports 1814A and 1814B are covered or wrapped with cushioning or padding. The hitch assembly 1806 includes two arms that brace the cart handle in three places to provide structural stability. The hitch assembly 1806 is preferably long enough that the bicycle or other vehicle can turn freely event with a long board or other bulky items loaded on the cart or rack attachment assembly or device.

According to some exemplary embodiments, a cart system having (1) an attachment or hitch assembly permitting connection of the cart to a vehicle, and 2) a rack or other devices to safely transport items (such as surfboards, kayaks or canoes) too large to fit into a conventional cart. The hitch assembly and rack attachment assembly or device can be attached to an existing cart or can form a frame to be attached to a set of wheels and used with its own independent cart.

In an exemplary embodiment, a cart systems described herein are constructed and arranged to be pulled by bicycles and all terrain vehicles (ATVs).

In the exemplary embodiments, an existing cart is not essential to the invention. The rack attachment assembly or device is constructed and arranged to be used with an existing cart. The cart systems described herein have wheels that allow the system to be rolled over sand or other surfaces. The cart systems are also configured to be coupled to a bicycle or ATV. The cart systems allow a cooler or other large items to be hauled to the beach or other recreation area with other beach gear to reduce the number of trips to unload the beach gear.

In the exemplary embodiments, the cart systems and method of use allow the carrying capacity of the cart system to be selectively expanded to increase the carrying capacity. The rack attachment assembly or device described herein increases the carrying capacity of existing carts with limited capacity by piggybacking a rack onto the existing cart to cradle large bulky beach items such as surfboard and kayaks on the side of, on top of or outside of the cart.

The exemplary embodiments provide a method of attaching a cart to a small vehicle so that a heavily loaded cart system can be easily moved to a recreational area or beach area.

The cart systems and rack attachment assemblies or devices described herein may be anodized when made of metal. The padding and cushioning is employed serves to minimize damage to surfaces of surfboard, kayaks and canoes during cradling.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A beach cart rack device for a wheeled cart comprising: a rack frame comprising a plurality of horizontal frame members coupled together to form a plurality of corners and a plurality of vertical frame members coupled to the horizontal frame members in proximity to the plurality of corners; connectors coupled to the free ends of the plurality of vertical frame members, the connectors being configured to attach to a wheeled cart; and at least one bracket pair coupled to the rack frame and being configured to cradle therein a surfboard or a kayak in a horizontal orientation, longitudinally, alongside or above the wheeled cart and in a tilted vertically upright orientation along a shortest axis; wherein the at least one bracket pair comprises a first kayak bracket pair selectively mounted to horizontal frame members of the frame, a first surfboard bracket pair selectively mounted to the frame on a first side of the wheeled cart, and a second surfboard bracket pair selectively mounted to the frame on a second side of the wheeled cart; wherein said first kayak bracket pair comprises a first bracket attached to a first of said horizontal frame members and a second bracket attached to a second of said horizontal frame members, wherein the first and second brackets are configured to support a longitudinal axis of the kayak horizontally along a horizontal longitudinal axis of the wheeled cart and the shortest axis of the kayak; wherein the first and second brackets have a J-shaped support structure and padding surrounding portions of the J-shaped support structure; wherein each of the first surfboard bracket pair and the second surfboard bracket pair comprises a first surfboard bracket attached to the frame and a second surfboard bracket attached to the frame and in spaced relation with respect to the first surfboard bracket, wherein the first and second surfboard brackets are configured to support the surfboard horizontally along a horizontal longitudinal axis of the wheeled cart and in the tilted vertically upright orientation along the shortest axis of the surfboard; further comprising a table, the table comprising two table sections, each table section being hingedly coupled to a respective one of the horizontal frame members on opposite sides of the rack frame and being configured to rotate between a horizontal state and a vertical state.

2. The rack device according to claim 1, wherein the first surfboard bracket and the second surfboard bracket are U-shaped.

3. The rack device according to claim 2, wherein the first and second surfboard brackets include a U-shaped support structure and padding surrounding portions of the U-shaped support structure.

4. The rack device according to claim 1, further comprising padding means attached to said at least one bracket pair.

5. The rack device according to claim 1, further comprising cushion sleeves, the cushion sleeves configured to wrap around a portion of each horizontal frame member.

6. The rack device according to claim 1, wherein the plurality of horizontal frame members are coupled together to form a rectangular-shaped frame; and the plurality of vertical frame members include a pair of front vertical frame members coupled to the frame and a pair of rear vertical frame members coupled to the frame.

* * * * *